US008622577B2

(12) United States Patent
Kemps et al.

(10) Patent No.: US 8,622,577 B2

(45) Date of Patent: Jan. 7, 2014

(54) LIGHTING DEVICE WITH AIR CIRCULATION MEANS

(75) Inventors: Peter Adrianus Albert Kemps, Schijndel (NL); Robertus Leonardus Tousain, Eindhoven (NL); Daniël Anton Benoy, Eindhoven (NL); Theodoor Cornelis Treurniet, Eindhoven (NL); Bastiaan Uitbeijerse, Helmond (NL); Jacob Cornelis Paul Den Dulk, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/202,468

(22) PCT Filed: Sep. 9, 2010

(86) PCT No.: PCT/IB2010/054059

§ 371 (c)(1), (2), (4) Date: Dec. 12, 2011

(87) PCT Pub. No.: WO2011/036591

PCT Pub. Date: Mar. 31, 2011

(65) Prior Publication Data

US 2012/0170270 A1 Jul. 5, 2012

(30) Foreign Application Priority Data

Sep. 23, 2009 (EP) .................................... 09171047

(51) Int. Cl.

| | |
|---|---|
| ***F21S 4/00*** | (2006.01) |
| ***F21V 21/00*** | (2006.01) |
| ***F21V 29/00*** | (2006.01) |
| ***B60Q 1/06*** | (2006.01) |

(52) U.S. Cl.

USPC ....................... 362/249.02; 362/294; 362/373

(58) Field of Classification Search

USPC .......... 362/227, 249.01, 249.02, 249.06, 257, 362/294, 362, 373, 364; 257/79–100; 454/294

See application file for complete search history.

(56) References Cited

U.S. PATENT DOCUMENTS 6,340,237 B1 1/2002 Koga et al.

(Continued)

FOREIGN PATENT DOCUMENTS

| | | |
|---|---|---|
| DE | 102007019074 A1 | 10/2008 |
| SU | 1441135 A1 | 11/1988 |

(Continued)

*Primary Examiner* — Jong-Suk (James) Lee

*Assistant Examiner* — Alexander Garlen

(74) *Attorney, Agent, or Firm* — John F. Salazar; Mark L. Beloborodov

(57) ABSTRACT

A lighting device comprises at least a light source (13, 33), a light emitting surface, an air inlet aperture (8, 9, 28), an air outlet aperture (8, 9, 28) and a cooling unit (4, 24) for moving air from the air inlet aperture (8, 9, 28) through the cooling unit (4, 24) to the air outlet. The air inlet aperture (8, 9, 28) and the air outlet aperture (8, 9, 28) are both located on the same side of the lighting device as at least part of the light emitting surface.

6 Claims, 6 Drawing Sheets

(56) References Cited

U.S. PATENT DOCUMENTS

| | | | | |
|---|---|---|---|---|
| 7,524,089 | B2 * | 4/2009 | Park | 362/294 |
| 2005/0111234 | A1 | 5/2005 | Martin et al. | |
| 2005/0174780 | A1 | 8/2005 | Park | |
| 2006/0193139 | A1 * | 8/2006 | Sun et al. | 362/373 |
| 2007/0115656 | A1 | 5/2007 | Chou et al. | |
| 2008/0212333 | A1 * | 9/2008 | Chen | 362/373 |
| 2009/0109625 | A1 * | 4/2009 | Booth et al. | 361/702 |

FOREIGN PATENT DOCUMENTS

| | | | |
|---|---|---|---|
| SU | 1772516 | A1 | 10/1992 |
| WO | 2008086665 | A1 | 7/2008 |
| WO | 2008099818 | A1 | 8/2008 |
| WO | 2009040703 | A2 | 4/2009 |
| WO | 2009149121 | A2 | 12/2009 |

* cited by examiner

LIGHTING DEVICE WITH AIR CIRCULATION MEANS

FIELD OF THE INVENTION

The invention relates to a lighting device comprising at least a light source, a light emitting surface, an air inlet aperture, an air outlet aperture and a cooling unit for moving air from the air inlet aperture through the cooling unit to the air outlet aperture.

BACKGROUND OF THE INVENTION

Such a lighting device, which is known from US 2005/0111234 A1, comprises a surface from which light is emitted to illuminate a room, for example. The light emitting surface of the lighting device is located at a front side of the lighting device. The lighting device comprises a shell and an optical reflector. A space between the shell and the optical reflector serves as an air channel. An air inlet aperture of the air channel is located near a socket of the lighting device whilst an air outlet aperture of the air channel is located at the front side of the lighting device. A ventilator unit is located between the air inlet aperture and the air outlet aperture for moving air from the air inlet aperture through the ventilator unit to the air outlet, which air dissipates the heat of the LED. The ventilator unit acts as a cooling unit. It is also possible to reverse the direction of air.

If such a lighting device is mounted in a ceiling or a luminaire which is closed at the back side of the lighting device, hardly any air flow will be possible. Furthermore, in the case that the flow of air is directed from the front side of the lighting device to the back side, the heated air will be exhausted above the ceiling or between the lighting device and the luminaire, thereby heating the space above the ceiling or between the lighting device and the luminaire, respectively.

SUMMARY OF THE INVENTION

It is an object of the invention to provide a lighting device in which active cooling by means of the cooling unit is improved.

This object is accomplished by means of the lighting device according to the invention in that the air inlet aperture, the air outlet aperture and at least part of the light emitting surface are located on the same side of the lighting device.

By having the air inlet aperture as well as the air outlet aperture on the front side of the lighting device, on which side also the light emitting surface of the lighting device is situated, the lighting device can be used also in applications where the back side of the lighting device itself is closed or the back side of the lighting device will be closed off or almost closed off by the luminaire or the ceiling. Since the air inlet aperture and the air outlet aperture are both located on the same side as at least part of the surface where light is emitted, there is no risk of the flow of air being blocked. The air entering the air inlet aperture will be relatively clean compared with for example air above a ceiling, so there will be less dust pollution of the lighting device. The air leaving the air outlet aperture will be dissipated in the relatively large space of the room in front of the lighting device, so the heating of that space will be minimal.

An embodiment of the lighting device according to the invention is characterized in that the air inlet aperture and the air outlet aperture are located on opposite sides of the light source.

The air outlet aperture is spaced apart from the air inlet aperture by the light source, so that the dissipated heated air will be mixed with fresh air and does not enter the air inlet aperture again until it is cooled off.

Another embodiment of the lighting device according to the invention is characterized in that the lighting device comprises a number of light sources arranged in a circle-shaped form, the air inlet aperture being located inside the circle-shaped form, and the air outlet aperture being located outside the circle-shaped form or vice versa.

The circle-shaped form can be a circle, oval, rectangle etcetera. By locating the air inlet aperture inside the circle-shaped form and the air outlet aperture outside the circle-shaped form or vice versa, a compact lighting device with a number of light sources is obtained, wherein heat generated by the number of light sources can be effectively dissipated by air flowing from the air inlet aperture to the air outlet aperture.

Yet another embodiment of the lighting device according to the invention is characterized in that the lighting device comprises a central axis, the direction of air flow through the cooling unit being parallel to the central axis.

Such a direction of flow is especially suitable when the air inlet aperture is located near the central axis and a ring-shaped air outlet aperture is located near the circumference of the lighting device or vice versa.

A further embodiment of the lighting device according to the invention is characterized in that the lighting device comprises a central axis, the direction of air flow through the cooling unit being perpendicular to the central axis.

Such a direction of flow is especially suitable when the air inlet aperture and the air outlet aperture are both half-ring-shaped and are located opposite to each other.

Yet a further embodiment of the lighting device according to the invention is characterized in that the lighting device comprises a heat sink provided with the air inlet aperture, the air outlet aperture and a cavity for the cooling unit.

By integrating the air inlet aperture and air outlet aperture in the heat sink a compact lighting device will be obtained.

BRIEF DESCRIPTION OF THE DRAWINGS

The invention will be explained in more detail with reference to the drawing, in which.

DETAILED DESCRIPTION OF EMBODIMENTS

In the Figures, like parts are indicated by the same numerals.

Figure 1A:
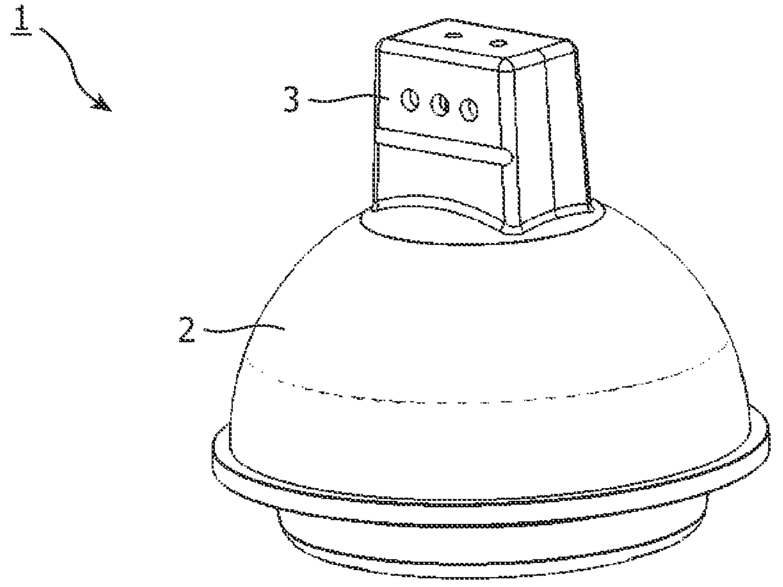
FIGS. 1A-1C are a perspective view, bottom view and exploded perspective view, respectively, of a first embodiment of the lighting device according to the invention.
Figure 1B:
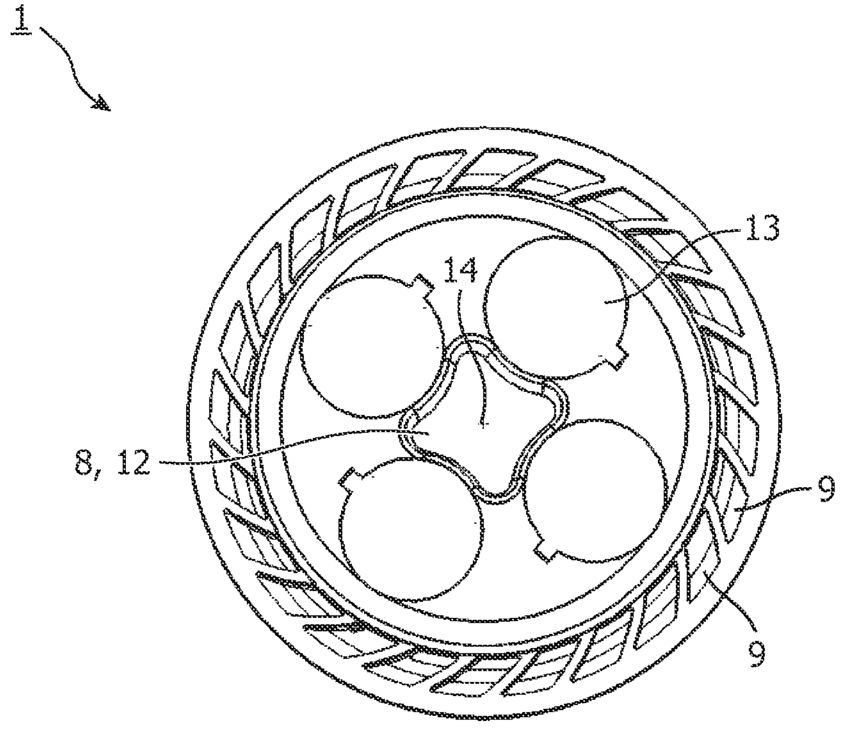
Figure 1C:
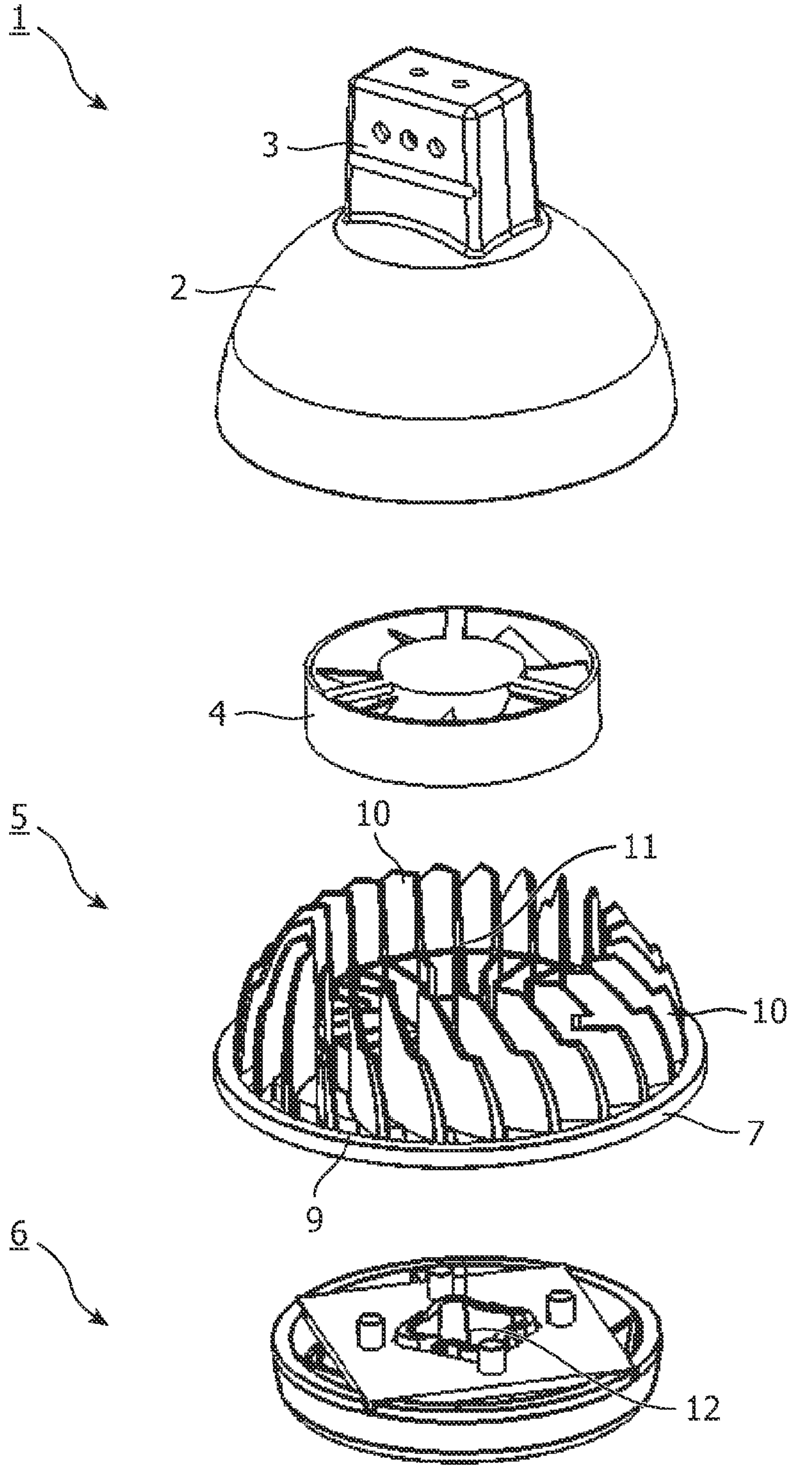

FIGS. 1A-1C show a first embodiment of a lighting device 1 according to the invention. The lighting device 1 comprises a cup-shaped housing 2, a socket 3 connected to the housing 2, a ventilator unit 4, a heat sink 5 and a lighting unit 6.

The heat sink 5 comprises a base plate 7 provided with a centrally located aperture 8 and a number of apertures 9 located around the aperture 8 at a distance therefrom. The heat sink 5 also comprises a number of fins 10 attached to the base plate 7 and situated between the apertures 9. Between the fins 10 a cavity 11 is available in which the ventilator unit 4 is positioned. The ventilator unit 4 is located parallel to the base plate 7.

The lighting unit 6 comprises a centrally located aperture 12 and four LEDs 13 located in a circle around the centrally located aperture 12. The LEDs 13 are electrically coupled to the socket 3. The light emitting surfaces of the LEDs 13 are located on the same side of the lighting device 1 as the apertures 8, 9, 12; in the embodiment shown, they are situated on the front side of the lighting device.

Figure 2:
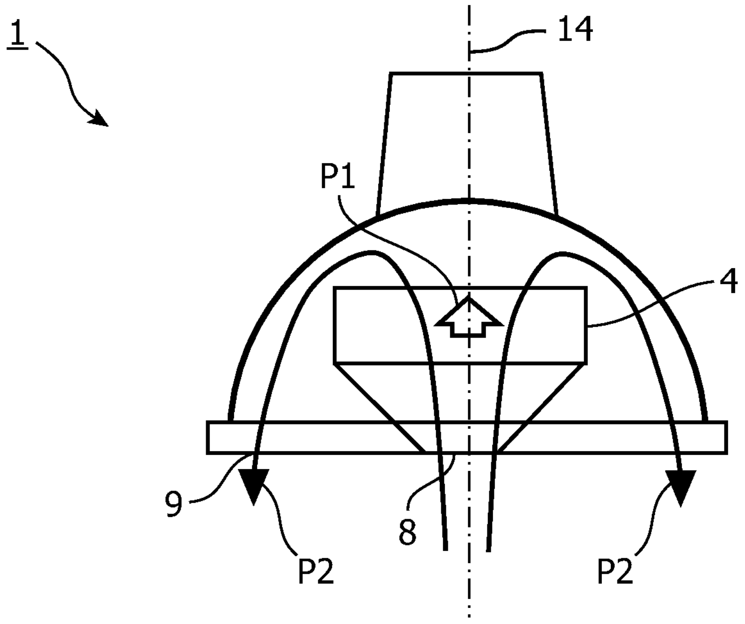
FIG. 2 is a cross sectional view of the lighting device as shown in FIGS. 1A-1C, with a flow of air in a first direction.

In the embodiment of the lighting device 1 as shown in FIG. 2, the ventilator unit 4 will cause a flow of air in a direction indicated by arrow P1, causing air to enter the centrally located aperture 8, flow through the ventilator unit 4, along the fins 10 of the heat sink 5 and leave the lighting device 1 through the apertures 9. The aperture 8 is the air inlet aperture whilst the number of apertures 9 are the air outlet apertures. The direction of the flow of air through the lighting device 1 is indicated by arrows P2.

Figure 3:
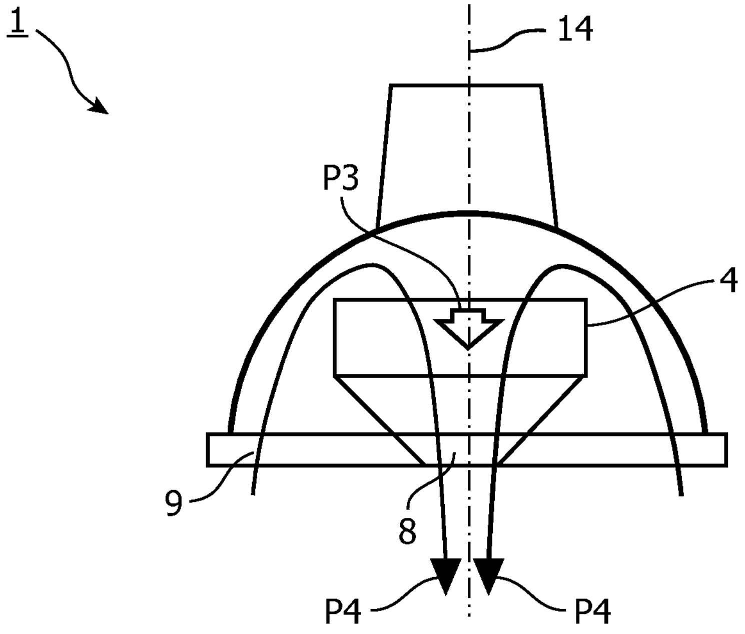
FIG. 3 is a cross sectional view of the lighting device as shown in FIGS. 1A-1C, with a flow of air in a second direction.
Figure 4A:
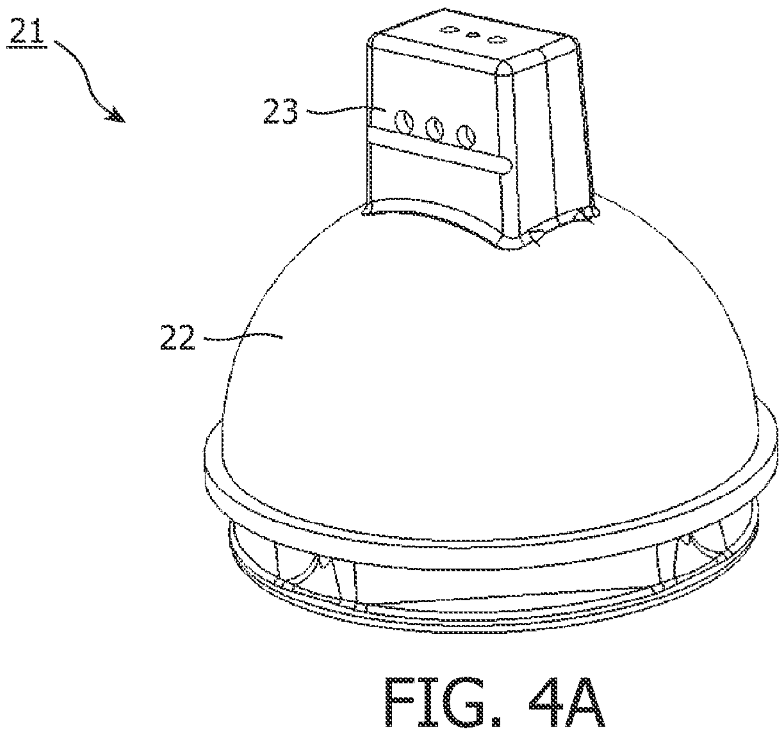
FIGS. 4A-4C are a perspective view, bottom view and exploded perspective view, respectively, of a second embodiment of the lighting device according to the invention.
Figure 4B:
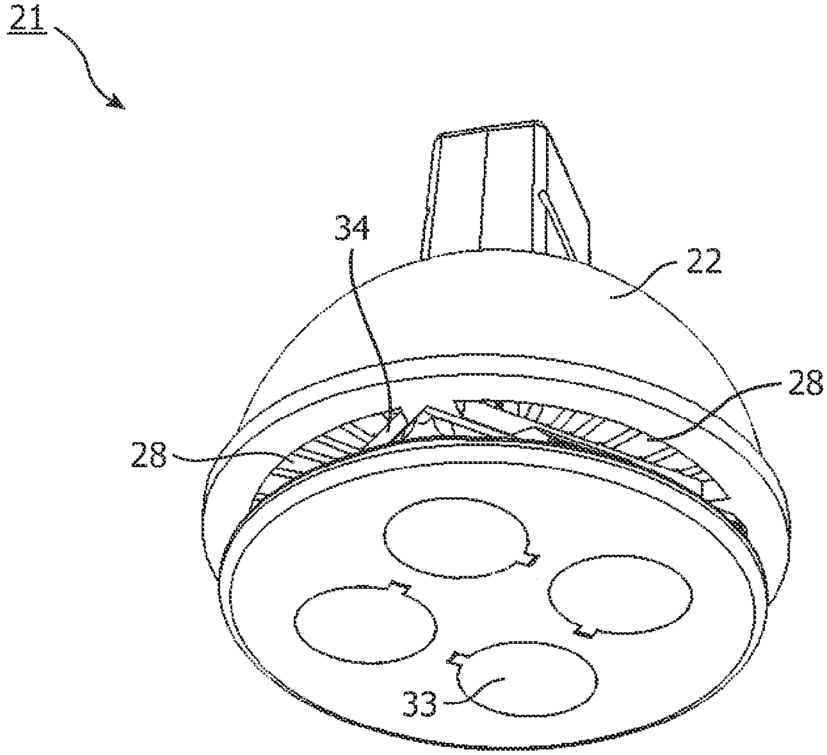
Figure 4C:
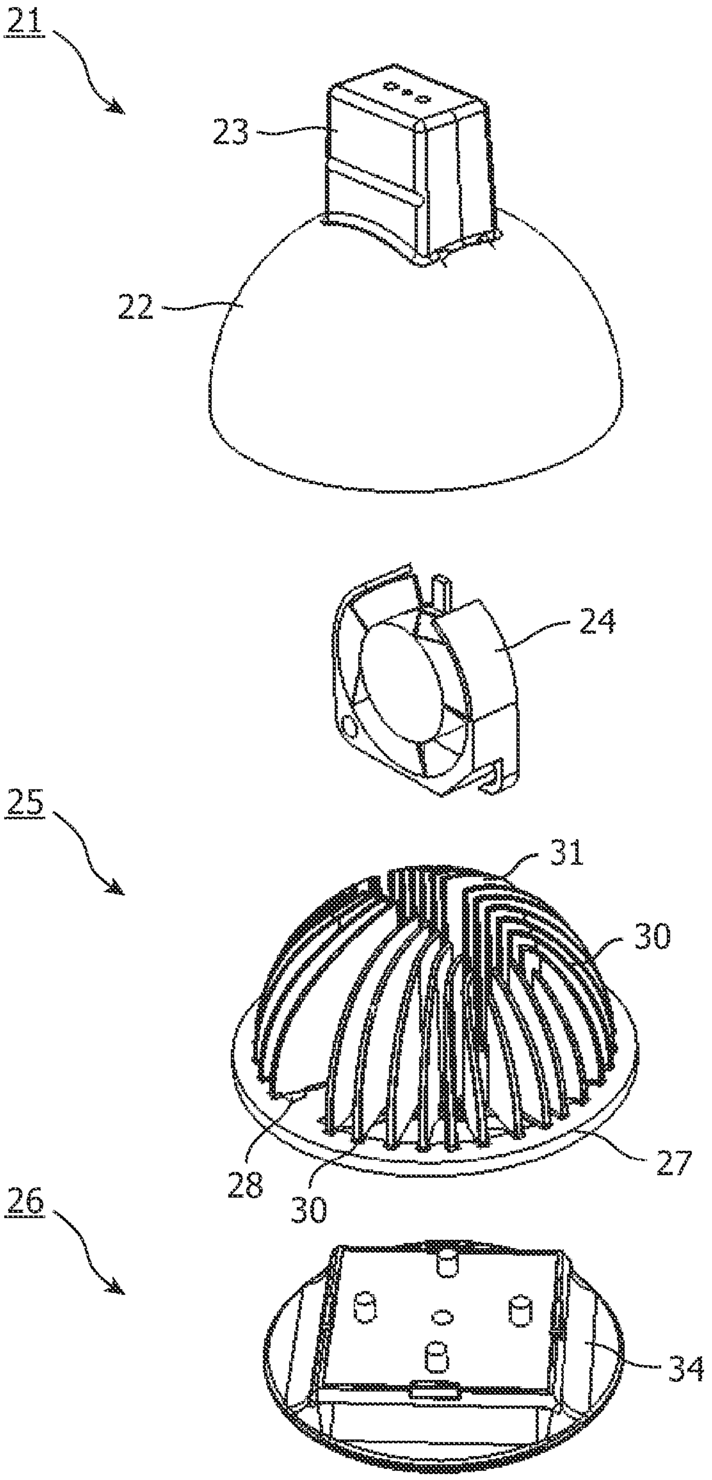
Figure 5:
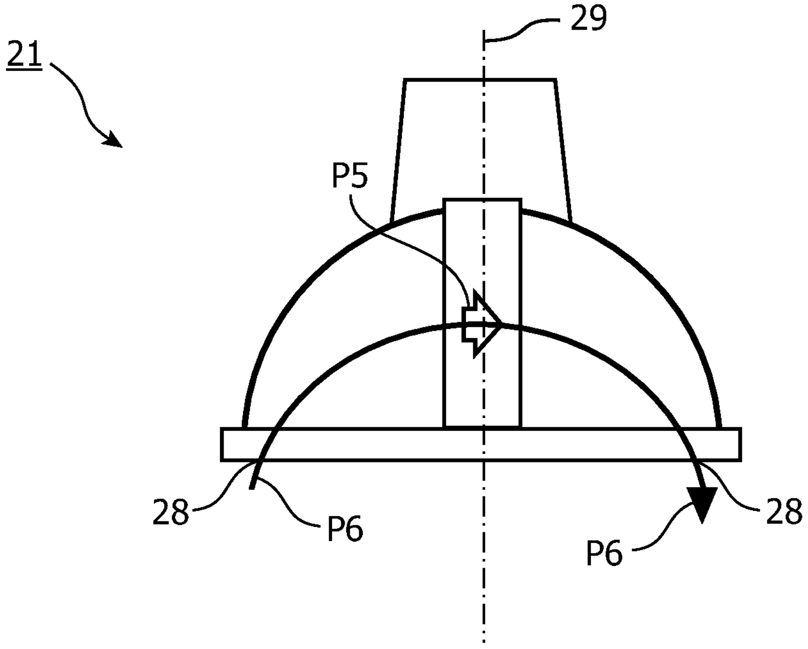
FIG. 5 is a cross sectional view of the lighting device as shown in FIGS. 4A-4C, with a flow of air in a third direction.

In the embodiment of the lighting device 1 as shown in FIG. 3, the ventilator unit 4 will cause a flow of air in a direction indicated by arrow P3, causing air to enter the apertures 9 located at a distance from the central axis 14, flow along the fins 10 of the heat sink 5, through the ventilator unit 4 and leave the lighting device 1 through the centrally located aperture 8. The aperture 8 is the air outlet aperture whilst the apertures 9 are the air inlet apertures. The direction of the flow of air through the lighting device 4 is indicated by arrows P4.

In the embodiments as shown in FIGS. 2 and 3, the direction of flow through the ventilator unit 4 is parallel to the central axis 14 of the lighting device 1.

FIGS. 4A-4C and 5 show a second embodiment of a lighting device 21 according to the invention. The lighting device 21 comprises a cup-shaped housing 22, a socket 23 connected to the housing 22, a ventilator unit 24, a heat sink 25 and a lighting unit 26.

The heat sink 25 comprises a base plate 27 provided with a number of apertures 28 located around a central axis 29 of the lighting device 21. The heat sink 25 also comprises a number of fins 30 attached to the base plate 27 and situated between the apertures 28. Between the fins 30 a cavity 31 is available in which the ventilator unit 24 is positioned. The ventilator unit 24 is located perpendicularly to the base plate 27.

The lighting unit 26 comprises four LEDs 33 located in a circle around the central axis 29. The LEDs 33 are electrically coupled to the socket 23. The lighting device 26 comprises inclined walls 34 forming air guiding means for guiding air towards the apertures 28 near the air entrance side of the ventilator unit 24 and guiding air away from the apertures 28 near the exhaust side of the ventilator unit 24.

In the embodiment of the lighting device 21, the ventilator unit 24 will cause a flow of air in a direction indicated by arrow P5, perpendicular to the central axis 29. Air will enter the apertures 28 located near the air entrance side of the ventilator unit 24. The air will then flow along the fins 30 of the heat sink 25 near said apertures 8. Air will continue to flow through the ventilator unit 24, along the fins 10 of the heat sink 25 on the exhaust side of the ventilator unit 24 and will leave the lighting device 21 through the apertures 28. One half of the apertures 28 are the air inlet apertures whilst the other half of the apertures 8 are the air outlet apertures. The direction of the flow of air through the lighting device 24 is indicated by arrow P6.

It is also possible to provide the housing 22 with openings through which air might leak to cool the electronics in the socket.

The lighting device may be provided with a driver unit comprising a printed circuit board with electronic components for driving the plurality of LEDs. In such a case, the driver unit will be coupled to the socket. Preferably such a driver unit is located inside the housing at a location where the flow of air will flow along the driver unit in order to cool it.

Instead of a ventilator unit as a cooling unit, other cooling units may be used like for example a synthetic jet for generating a flow of air.

The invention claimed is:

1. A lighting device having a central axis and a front side and comprising a plurality of circumferentially disposed light sources defining an area therebetween and configured to emit light through a light-emitting surface, at least one air inlet aperture, at least one air outlet aperture, a cooling unit for moving air from the air inlet aperture through the cooling unit to the air outlet aperture, the air inlet aperture, the air outlet aperture and at least part of the light emitting surface being located on said front side of the lighting device, said plurality of circumferentially disposed light sources being arranged in a circle shaped form around an airflow aperture of said cooling unit, said airflow aperture in fluid communication with the air inlet aperture and the air outlet aperture, the plurality of circumferentially disposed light sources positioned between the air inlet aperture and the air outlet aperture, wherein either the air inlet aperture or the air outlet aperture is disposed within the area defined by the light sources, and wherein the direction of airflow through the cooling unit is parallel to the central axis.

2. A lighting device according to claim 1, wherein the lighting device comprises a heat sink defining the air inlet aperture, the air outlet aperture and a cavity for receiving the cooling unit.

3. A lighting device according to claim 1, wherein the light sources are LEDs.

4. A lighting device according to claim 1, comprising at least four light sources.

5. A lighting device according to claim 4, wherein the air inlet aperture is axially disposed within the area relative to the central axis.

6. A lighting device according to claim 5, comprising a plurality of air outlet apertures circumferentially disposed outside the area, such that each light source is disposed between the air inlet aperture and at least one air outlet aperture.

* * * * *